United States Patent
Jabusch et al.

(10) Patent No.: US 7,246,662 B2
(45) Date of Patent: Jul. 24, 2007

(54) SYSTEMS AND METHODS FOR CONTROLLING FLOW CONTROL DEVICES

(75) Inventors: Kirby Jabusch, Edmonton (CA); Colin Bussiere, Ardrossan (CA)

(73) Assignee: Core Laboratories Canada Ltd, Calgary, Alberta (CA)

( * ) Notice: Subject to any disclaimer, the term of this patent is extended or adjusted under 35 U.S.C. 154(b) by 337 days.

(21) Appl. No.: 10/813,471

(22) Filed: Mar. 30, 2004

(65) Prior Publication Data

US 2005/0217350 A1    Oct. 6, 2005

(51) Int. Cl.
*E21B 43/12* (2006.01)

(52) U.S. Cl. .................... 166/250.15; 166/62; 166/66; 166/105

(58) Field of Classification Search ........... 166/250.03, 166/250.15, 66, 105, 60–62
See application file for complete search history.

(56) References Cited

U.S. PATENT DOCUMENTS

| | | | | |
|---|---|---|---|---|
| 3,432,840 A | * | 3/1969 | Neapolitakis et al. | 340/622 |
| 3,479,875 A | * | 11/1969 | Riddel | 73/295 |
| 3,930,752 A | | 1/1976 | Douglas | 417/12 |
| 3,938,910 A | | 2/1976 | Douglas | 417/12 |
| 4,285,401 A | * | 8/1981 | Erickson | 166/303 |
| 4,564,834 A | | 1/1986 | Steele | 340/622 |
| 4,609,913 A | * | 9/1986 | Arbogast et al. | 340/622 |
| 4,943,210 A | | 7/1990 | Bailey, Jr. et al. | 417/12 |
| 4,988,389 A | * | 1/1991 | Adamache et al. | 166/302 |
| 5,634,522 A | | 6/1997 | Hershberger | 166/372 |
| 6,516,879 B1 | | 2/2003 | Hershberger | 166/250.03 |
| 6,547,004 B2 | * | 4/2003 | Last et al. | 166/250.03 |
| 6,615,925 B2 | | 9/2003 | Rice | 166/369 |
| 6,943,340 B2 | * | 9/2005 | Tubel et al. | 250/227.14 |
| 2003/0010491 A1 | * | 1/2003 | Collette | 166/65.1 |
| 2003/0127223 A1 | * | 7/2003 | Branstetter et al. | 166/250.15 |

\* cited by examiner

*Primary Examiner*—Hoang Dang
(74) *Attorney, Agent, or Firm*—Madan, Mossman & Sriram, P.C.

(57) ABSTRACT

A device for determining a location of an interface between a first fluid and second fluid includes a non-mechanical sensor that measures a selected parameter of interest relating to the fluid surrounding the sensor ("the surrounding fluid") and a processor for processing the sensor measurements. The non-mechanical sensor measures a parameter relating to the surround fluid without physically co-acting with the surrounding fluid. Exemplary parameters such as thermal properties, electrical properties, fluid properties, and magnetic properties can be measured. The processor is programmed to process the sensor measurements to identify one or more characteristics in the measurements that can indicate the nature of the fluid being measured and thereby determine the location of the interface. The determined location can be used to operate a downhole device such as a pump, to provide real-time monitoring of well conditions, to record data for long-term reservoir characterization, or to actuate an alarm.

23 Claims, 5 Drawing Sheets

SYSTEMS AND METHODS FOR CONTROLLING FLOW CONTROL DEVICES

CROSS-REFERENCE TO RELATED APPLICATIONS

None.

BACKGROUND OF THE INVENTION

1. Field of the Invention

The present invention relates to control systems and methods for fluid extraction from oil and gas wells. More particularly, the present invention relates to methodologies for controlling a downhole pump in an oil or gas well to optimize the fluid removal process and/or gas, oil, or water production. In another aspect, the present invention relates to systems and devices for optimal control of a flow control device. In yet another aspect, the present invention relates to systems and methods for monitoring and recording physical changes in a fluid body.

2. Description of the Related Art

Hydrocarbons (e.g., oil and gas) are recovered by drilling a wellbore in a subterranean formation having one or more hydrocarbon reservoirs. Under formation pressure or by artificial lift, the hydrocarbons flow up the wellbore and are recovered at the surface, a process commonly referred to as hydrocarbon production. In many instances, downhole devices such as pumps are used to assist in hydrocarbon production. For example, pumps are often used to control the levels of fluids in the wellbore (e.g., water, gas, oil), to provide a pressure boost to flow the wellbore fluids to the surface or other location, or to otherwise adjust the wellbore environment to maintain efficient production. Wellbore pumps are used in a number of applications, including: conventional oil production, heavy oil production, gas-dewatering, and coal-bed methane production.

Coal-bed methane production is illustrative of some aspects of wellbore or downhole pumps and associated control devices. Coal bed methane is methane that is found in coal seams. Methane is a significant by-product of coalification, the process by which organic matter becomes coal. Often the coal seams are at or near underground water or aquifers, and coal bed methane production is reliant on manipulation of underground water tables and levels. The underground water often saturates the coal seam where methane is found, and the underground water is often saturated with methane. The methane may be found in aquifers in and around coal seams, whether as a free gas or in the water, adsorbed to the coal or embedded in the coal itself. Methane is a primary constituent of natural gas. Recovery of coal bed methane can be an economic method for production of natural gas. Such recovery is now pursued in geologic basins around the world. However, every coal seam that produces coal bed methane has a unique set of reservoir characteristics that determine its economic and technical viability.

Methods of coal bed methane recovery vary from basin to basin and operator to operator. However, a typical recovery strategy is when a well is drilled into the coal seam, usually a few hundred to several thousand feet below the surface. Thereafter, a casing is set and cemented in place and a water pump and gas separation device are installed. The water pump is operated to remove water from the coal seam at a rate appropriate to reduce the hydrostatic pressure exerted on the formation fluids. When the hydrostatic pressure is sufficiently low, the methane desorps from the coal. However, because the rate of desorption varies roughly inversely with the exerted hydrostatic pressure, dropping the hydrostatic pressure too low may result in a rate of methane production that can overwhelm the methane recovery equipment. Thus, control over the water head or height of a water column in the well is a significant factor in the production of methane.

In conventional coal-seam gas wells, submersible pumps with variable speed controllers are used as liquid removal systems. Typically, these pumps are controlled in response to a determination of the water level in the wellbore. A conventional arrangement includes a liquid level sensor that uses a pressure responsive switch. For instance, the system can have an electrical control circuit including a switch which operates to turn on the water pump motor when the water level in the well reaches a certain high level (as measured by the pressure responsive switch) and to turn off the pump motor the water level reaches a certain low level in the well. These sensors are exemplary of mechanical sensors—i.e., sensors that mechanically co-act with the sensed fluid in order to measure a condition in the wellbore (e.g., the presence or absence of surrounding water). For example, an element of a pressure switch moves or compresses in response to hydrostatic pressure or a float member of a float switch moves in response to buoyancy force. The mechanical and electrical elements of such mechanical devices can be prone to sticking, wear and corrosion. Thus, a long-standing and persistent drawback of such sensors is that their operating life can be much shorter than the life of a production well. The cost accompanying the cessation of gas or oil production to repair or replace an inoperative sensor can be significant.

Pump control devices utilizing mechanical sensors encounter similar modes of failure when used in conventional oil pump control, heavy oil pump control, and gas-dewatering pump control. In these applications as well, production objectives such as maintaining a fluid level between specific levels to optimize the production, avoiding pumping the well off, optimizing energy consumption, and reducing wear and tear on the pump are in large measure contingent upon reliable devices and methodologies for controlling downhole pumps and other such devices. More generally, the need to reliably control pump operation arises in other applications such as refineries, water treatment plants, chemical production facilities, underground gas or liquid, storage caverns, and other instances wherein the level/quantity/flow rate/velocity of fluid is controlled or wherein the mixture or ratio of fluids is controlled.

The present invention addresses these and other drawbacks of the prior art.

SUMMARY OF THE INVENTION

In one aspect, the present invention provides a device for determining a location of an interface between a first fluid and second fluid, such as in a wellbore, a storage tank, a cavern, etc. The device includes a non-mechanical sensor that measures a selected parameter of interest relating to the fluid surrounding the sensor ("the surrounding fluid") and a processor for processing the sensor measurements. The non-mechanical sensor does not utilize motion or a physical co-action between the surrounding fluid and the sensor to produce a measurement. Rather, the non-mechanical sensor measures parameters such as thermal properties (e.g., thermal conductivity or capacity), electrical properties (e.g., resistance, capacitance, inductance, etc.), fluid properties (e.g., viscosity), and magnetic properties. Because liquids and gases have distinct and identifiable differences in such properties, the processor can be programmed to process the sensor measurements to identify one or more characteristics in the measurements that can indicate the nature of the fluid being measured. Once the nature of the fluid is identified (e.g., whether the fluid is water, oil, methane, etc.), the location of the interface can be determined. The determined location can be used for any number of purposes, including, but not limited to, real-time monitoring via a display device, recorded for long-term reservoir characterization, or for actuating an alarm if a pre-set condition is met.

In one embodiment directed to wellbore fluids, the system includes a sensor positioned in the wellbore and a processor in communication with the sensor. The sensor includes a temperature probe for measuring the temperature of a surrounding fluid. In certain embodiments, the sensor heats the surrounding fluid while measuring temperature. The heating element can be the probe itself or a separate element. The processor processes the temperature measurements to identify the state or nature of the surrounding fluid, e.g., whether the fluid is gas (e.g., methane) or a liquid (e.g., water). For instance, the processor can develop a curve based on the temperature measurements and then identify curve characteristics (e.g., amplitudes, differentials, slopes, etc.) that are indicative of a liquid or a gas.

In another aspect, embodiments of the invention can be used to control a downhole fluid control device such as a pump or valve. In one arrangement, two non-mechanical fluid level sensors are positioned in spaced-apart relation in a wellbore having a water column. The height of the water column is adjusted by selective operation of a downhole pump. During use, a controller operatively coupled to the non-mechanical fluid level sensors determines whether one or both of the non-mechanical sensors are surrounded by water or a gas. After making this determination, the controller alters the operation of the pump (if needed) to bring the height of the water column into a selected range or height. The level sensors can be positioned physically at the operating switch points for the pump (e.g., the upper and lower limits for the height of the water column). Alternatively, the level sensors can be positioned within the upper and lower limits of the water column height. For instance, the processor can determine the rate of change of the height of the water column and predict by interpolation or extrapolation the height of the water column. The processor can, optionally, also use measurements from other sensors that relate to hydrocarbon production, water production, and wellbore conditions.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

Similar reference characters denote corresponding features consistently throughout the attached drawings.

DETAILED DESCRIPTION OF THE PREFERRED EMBODIMENT

Figure 1:
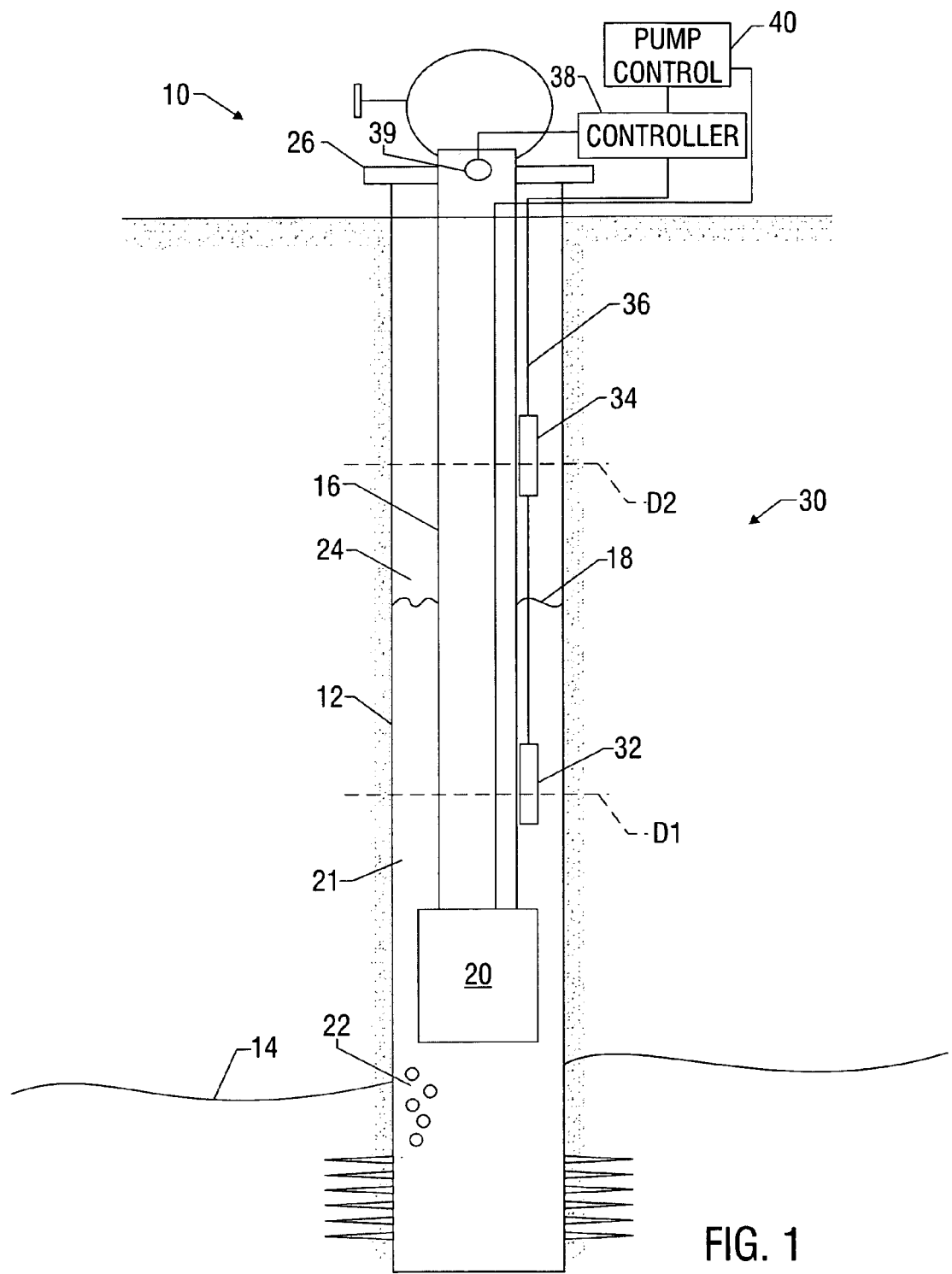
FIG. 1 schematically illustrates an elevation view of one embodiment of a well having a pump control system made according to one embodiment of the present invention.

The present invention relates to devices and methods for controlling equipment, such as pumps, used to recover hydrocarbons (e.g., methane) from subterranean formations. The control systems and methods can apply to any artificial or natural lift technique, including but not limited to gas-lift, PCP pump, ESP pump, rod pump, downhole control valves for selective zone control. The present invention also relates to devices and methods for determining the location of an interface between a first liquid and a second liquid. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

As will become evident in the discussion below, embodiments of the present invention may be used to enhance the production of methane from subterranean formations such as coal bed or enhance the production of oil from conventional or heavy oil formations. Referring initially to FIG. 1, there is shown a facility for recovering methane from a subterranean formation. In one embodiment, the methane recovery facility 10 includes a cased well 12 that intersects a coal bed 14. Suspended or hung within the cased well 12 is a production tubing 16. The well 12 is partially filled with water that continually drains out of the formation, the water line being designated by numeral 18. A pump 20 connected to an end of the production tubing 16 is used to pump water out of the cased well 12 to the surface or other locations (e.g., a subsurface formation). Operation of the pump 20 controls the height of the water column 21 and therefore the hydrostatic pressure exerted on the coal bed 14. When the hydrostatic pressure drops below a particular level or amount, methane 22 flows out of the formation 14 via an annulus 24 formed by the production tubing 16 and cased well 12. Methane 22 is collected at the wellhead 26 and piped or otherwise transported for further refinement.

It will be appreciated that if the water level in the case well 12 is sufficiently high, the resulting hydrostatic pressure will suppress or extinguish the production of methane 22. On the other hand, if the water level 18 drops too low, such as below the pump 20, the pump 20 may be damaged. Moreover, the loss of hydrostatic pressure can lead to an excessive release of methane and an over pressure situation in the well 12 and at the wellhead 26. Thus, the wellbore can be considered to have two fluids: a gas (e.g., methane) and a liquid (e.g., water). The location of the interface between these two fluids impacts the production of the hydrocarbons residing in the formation.

In one embodiment, a pump control system 30 for controlling pump operation includes a lower level sensor 32, an upper level sensor 34, a telemetry cable 36 and a controller 38. The controller 38 periodically communicates with the level sensors 32 and 34 to determine whether operation of the pump 20 should be adjusted in response to changes in the height of the water column 21 (i.e., shifts in location of the water-gas interface). A number of arrangements may be employed to make this determination.

In one arrangement, the controller 38 is programmed to energize and de-energize the pump 20 upon detecting one or more predetermined conditions. For instance, a first predetermined condition may be a height of a water column 21 below a first depth D1. It may be determined that a water column 21 below the first depth D1 may apply insufficient hydrostatic pressure to the formation or raise the risk that the pump 20 may not be fully submerged. Thus, the lower sensor 32 is positioned at the first depth D1. A second predetermined condition may be a water column 21 having a height at or above a second depth D2, a height causing a hydrostatic pressure that unacceptably impairs the production of methane. Therefore, the upper sensor 34 is set at the second depth D2. During operation, the controller 38 periodically interrogates each sensor 32, 34. Based on the sensor response, the controller 38 determines whether either the first or second predetermined condition is present and, if needed, takes appropriate action. Thus, the first and second depths D1, D2 are pre-determined set-points that are used to adjust the operation of the pump 20.

There are several actions that can be taken by the controller 38 after interrogating the sensors 32, 34. For instance, the controller 38 can be programmed to de-energize the pump 20 if the response of the lower sensor 32 indicates that the water level is at or below the lower sensor 32 and energize the pump 20 if the response of the upper sensor 34 indicates that water level 18 is at or above the upper sensor 34. In other embodiments, the controller 38 can include a timer that energizes or de-energizes the pump 20 after a pre-set time delay. In still other embodiments, the controller 38 can be programmed to adjust (e.g., increase or decrease) the flow rate of the pump 20 in response to the detected predetermined condition.

In certain embodiments, the controller 38 can be configured to provide intelligent control of the pump 20 based on measurements relating to one or more parameters of interest. In one embodiment, the controller 38 can include microprocessors having programs for optimizing operation of the pump 20. For instance, the controller 38 can be programmed to calculate the rate of change of the height of the water column 21 by measuring the time required for the water column 21 to transition between the lower sensor 32 and the upper sensor 34. The controller 38 can utilize the results of this calculation to determine whether the pump 20 should be energized/de-energized, whether a time delay should be used before adjusting operation of the pump 20, and/or to determine the type and magnitude of adjustment to the flow rate of the pump 20.

Additionally, in certain embodiments, parameters of interest relating to methane or water production and/or wellbore conditions may be utilized by the controller 38 to optimize operation of the pump 20. For example, a sensor 39 at the wellhead 26 (or other location) can provide information on production flow rate of methane and/or water to the controller 38. Parameters relating to wellbore conditions include fluid inflow, pressure and temperature. Optimization models provided in the controller 38 can utilize this information to maintain the height of the water column 21 within a predetermined or calculated optimal range. It should be appreciated that what constitutes optimal operation can vary with the operator, application and other factors. Exemplary optimal operation can include maximizing methane production, minimizing cycling of the pump 20, minimizing the operating time of the pump 20, and reducing the risk of running the pump dry (thus damaging the pump), etc.

Figure 2:
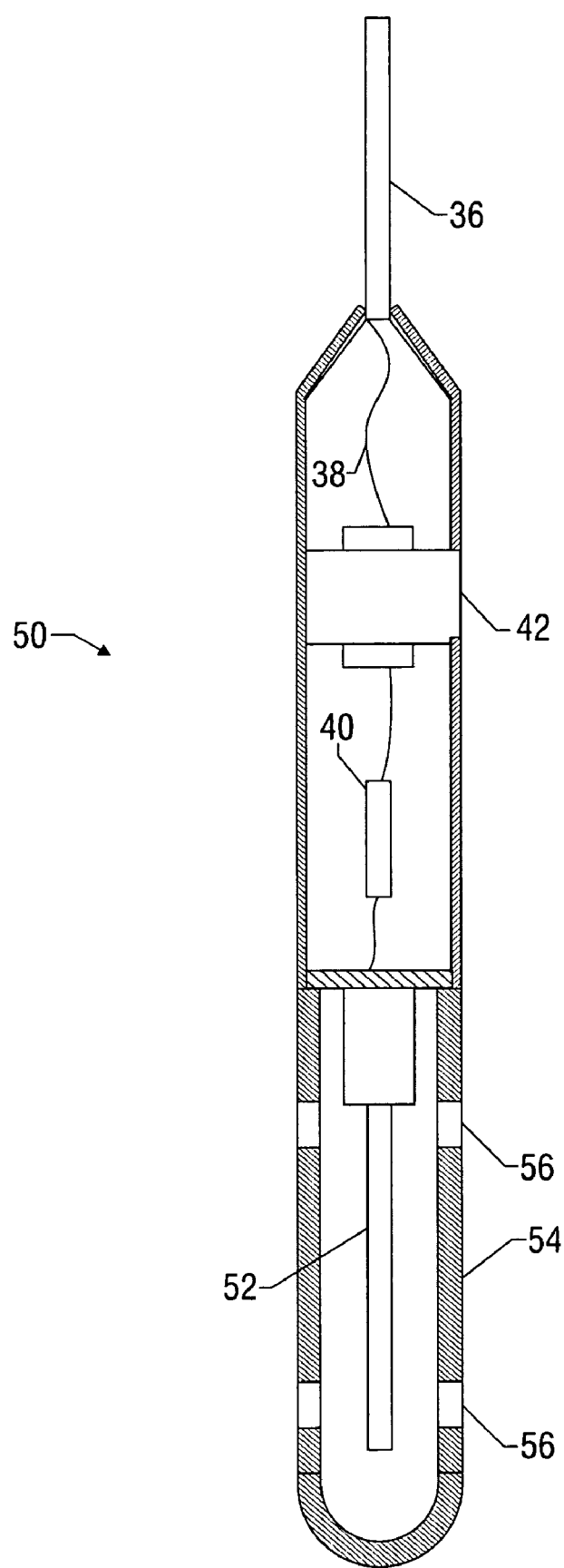
FIG. 2 schematically illustrates a sectional view of a sensor made according to one embodiment of the present invention.

Referring now to FIG. 2 there is shown one embodiment of a level sensor 50 suitable for use in the control system 30 (FIG. 1). The sensor 50 includes a probe 52 that produces a signal indicative of the thermal property of the wellbore fluid in which it is immersed. Wellbore fluids can include liquids such as water and gases such as methane. During production, the wellbore fluids such as methane can have relatively high flow rates. In many instances, positioning the probe directly within the flowing gas can degrade the capacity of the sensor 50 to make accurate measurements. Therefore, in some embodiments, one or more probe shields 54 having vent holes 56 surrounds the probe 52. For illustrative purposes only one shield 54 is shown. The shield 54 protects the probe 52 by shielding it from direct splashing and exposure to vigorously turbulent or bubbling wellbore fluids and high velocity gas. The vent holes 56 allow the wellbore fluids to enter the shield 54 and envelope the probe 52, but keep the probe protected from liquid splash and out of the direct channel of flowing gas. The cable 36 is coupled to the probe 52 by a suitable wiring 38. In certain embodiments, telemetry systems using RF, EMF, pressure waves or acoustics may be used in lieu of or in addition the wiring 38. A pressure seal 42 may be used to insulate the electrical connection between the cable 36 and the probe 52. In certain applications, the cable 36 includes a mono-conductor cable. Thus, to operate two probes over the mono-conductor cable, the sensor 50 includes a diode 40 to allow selective control over either of the probes. In certain applications other sensors may be combined with the system on a separate or same cable to produce a combination of measurements. One such example of this is the addition of a down-hole pressure sensor.

Figure 3:
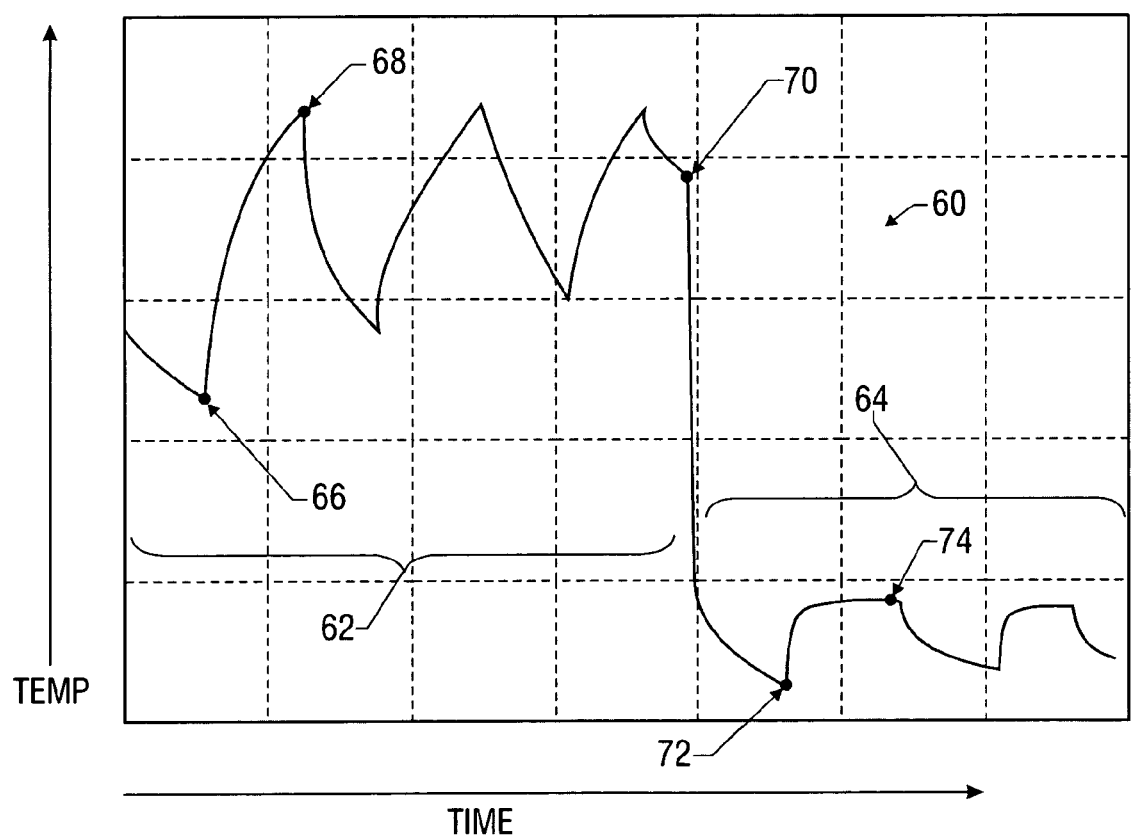
FIG. 3 shows an exemplary temperature versus time graph for a FIG. 2 sensor.

One illustrative probe 52 is a resistance temperature detector RTD probe, the use of which is described below. RTD is defined as any resistance temperature detector. It consists of a resistive element that changes its electrical resistance as the temperature changes. This is commonly referred to as a platinum resistor, RTD, or thermistor. Other devices also change their resistance due to temperature that can be made from copper, nickel or nickel-iron, or any other electrical conductor that changes its resistance with respect to temperature. Referring now to FIGS. 1-3, in one mode of operation, the controller 38 initiates the transmission of a signal, such as an electrical signal, via the cable 36 to the RTD probe 52. In one arrangement, the controller 38 is programmed to measure the temperature differentials created by repetitively heating the probe 52 and letting it cool down to ambient temperature. Fluid has both a higher thermal capacity and thermal conductivity. Both properties influence the thermal loading effect. An RTD probe changes its electrical resistance with respect to temperature and therefore an indication of temperature can be obtained by several methods using applied current and voltage to the probe. The resultant measurement represents a change in resistance of the probe that proportionally is a measure of the effective temperature of the probe.

FIG. 3 illustrates an exemplary temperature versus time curve 60 for such cyclic heating and cooling of the probe 52. As can be seen the temperature curve 60 has two distinct portions. One portion 62 represents the response of the probe 52 when immersed in a gas (e.g., air or methane) and the other portion 64 represents the response of the probe 52 when immersed in fluid. In the exemplary curve 60, the probe 52 is energized at point 66. Because the probe 52 is immersed in gas, the resulting thermal loading is relatively light and allows the probe 52 to have a relatively substantial increase in temperature. Heating is terminated at point 68 to allow the probe to cool to ambient. Again, the probe 52 displays a relatively large temperature drop due to its immersion in gas. The heating and cooling can be repeated as needed to gather sufficient information to characterize the behavior of the probe 52. At point 70, the probe 52 becomes immersed in a fluid. Heating at point 72 of the probe 52 results in a relatively lower temperature increase due to the relatively high thermal loading caused by the water. At point 74, the probe 52 is de-energized and allowed to cool to ambient temperature. In like fashion, the temperature drop is relatively small because of the high thermal loading caused by the fluid. It should be appreciated that the temperature differential between points 66 and 68 is greater than the temperature differential between points 72 and 74. Thus, by measuring the temperature differential, the controller 38 can determine whether the RTD probe 52 is immersed in water or is above water line 18. It should be appreciated that no mechanical co-action is needed between any component of the sensor 50 and the fluid being sensed; i.e., no element of the sensor 50 is designed to mechanically move in order to make a measurement. Thus, advantageously, the risk that the sensor 50 will suffer a premature failure is reduced because a prevalent mode of failure (mechanical failure) has been largely eliminated.

In another arrangement the sensor may include a first element for heating the surrounding fluid and a second element for measuring the temperature (or temperature change) in the surrounding fluid. With this methodology a similar result of identifying the difference in thermal properties between the gas and fluid can be achieved. This arrangement can allow for measurement of thermal conductivity or heat capacity. Both properties are substantially different and uniquely identifiable in the two mediums.

It should be understood that other methodologies can be employed to determine the nature and magnitude of a given thermal loading. For example, the curves connecting points 66 and 68 and points 72 and 74 may have unique and distinct characteristics; e.g., different slopes, different rates of change of slopes during heating or cooling, etc. Thus, analysis and quantification of the characteristics of the curves can lead to additional methods for use in determining thermal loading (e.g., measuring rate of change of slopes, frequency change, curve characteristics). In addition to using the distinctive thermal properties of liquids and gases such as thermal conductivity, specific heat, and head capacity, as a criteria for determining the type of fluid in which a probe is immersed, other properties such as resistivity, conductivity, capacitance, inductive, magnetic, electromagnetic, optical, viscosity, density, surface tension, compressibility speed of sound, sonic impendence, fluid or gas properties and chemical properties may be used as the basis for making such determinations.

Figure 4:
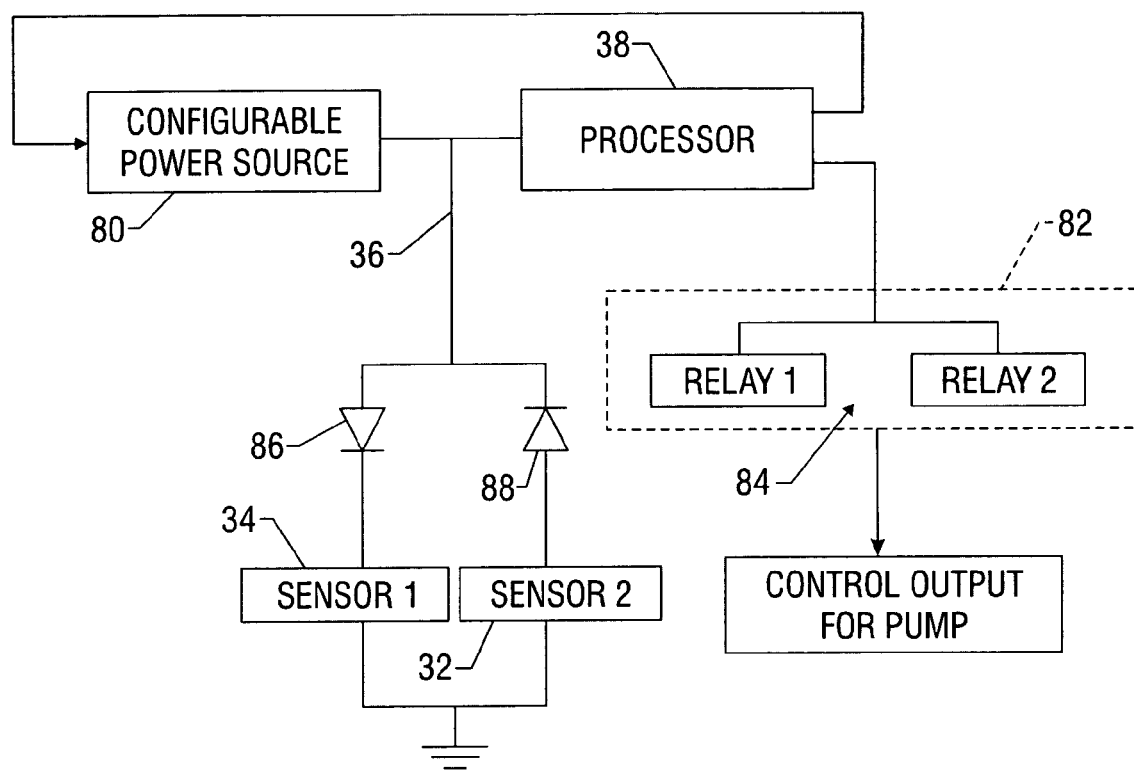
FIG. 4 schematically illustrates a pump control circuit made according to one embodiment of the present invention.

Referring now to FIG. 4, there is shown an exemplary control system utilizing the sensors 32, 34. The system of FIG. 4 includes the upper level sensor 34, the lower level sensor 32, the processor or controller 38, a power source such as a current source 80, and a pump control unit 82. The sensors 32, 34, processor 38 and the current source 80 are operably coupled by a suitable data conduit or carrier 36. In response to a command signal issued by the processor 38, the current source 80 generates an electrical signal for heating the sensors 32, 34. The current output by the source 80 is also used for doing a two-point resistance measurement utilizing the sensors 32 and 34. The processor 38 measures the response of the sensor 32, 34 to determine whether their thermal loading is indicative of a surrounding gas or liquid. Based on the determination, the processor 38 operates a pump control unit 82 having one or more relays 84 that are coupled to the pump (not shown). For example, the processor 38 opens and closes the relays 84 as necessary to control the operation of the pump (not shown). The pump controller may also communicate directly with the processor 38 via a direct digital interface, serial or parallel data bus or analog data transfer. (not shown). Diodes 86, 88 can be used to selectively energize or actuate the sensors 32, 34 (i.e., the sensors 32, 34 operate at opposite polarities). In addition to being advantageous where a carrier 36 includes a monoconductor, such an arrangement also readily allows the substantially simultaneous heating of one sensor and the cooling of the other sensor.

Figure 5:
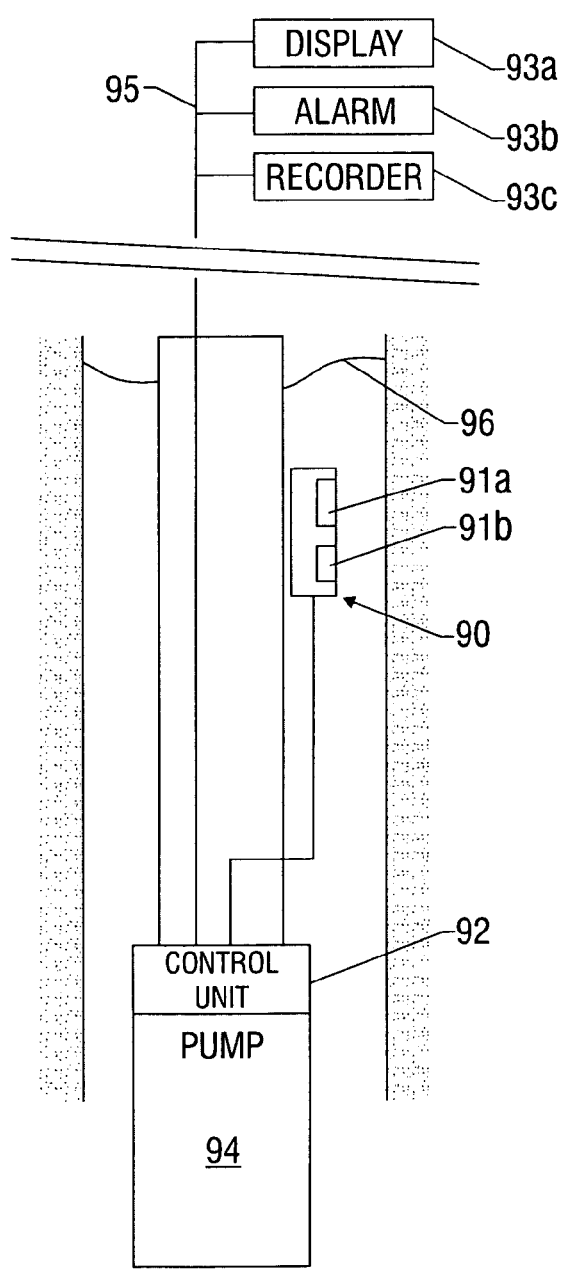
FIG. 5 schematically illustrates an elevation view of another embodiment of a well having a pump control system made according to the present invention.

Referring now to FIG. 5, there is shown another embodiment of the present invention using a single sensor 90 operable coupled to a downhole control unit 92 for operating a pump 94. Merely for illustrative purposes, the single sensor 90 is shown having a heating element 91a separate from a temperature probe 91b. In the FIG. 5 embodiment, the control unit 92, in one mode of operation operates the pump 94 until a specified condition has been met, e.g., the response of the sensor 90 indicates that the height of the water column 96 has dropped below the sensor 90. Upon occurrence of the condition, the control unit 92 stops operation of the pump 94. The control unit 92 can be programmed to re-initiate operation of the pump 94 after a pre-set or predetermined time delay, or after the water column 96 has reached a specified height, or the detection of some other specified condition. Additionally, the control unit 92 can include microprocessors that process measurements of parameters relating to wellbore conditions or production to optimize control of the pump 94. The control unit 94 can be programmed to operate in a closed loop fashion (i.e., automatically) or with human intervention. The power source (not shown) for activating (e.g., heating and resistivity measurements) the sensor 90 can be integrated into the control unit 94 or can be constructed as a separate unit. Moreover, power can be transmitted from a surface source (not shown) or provided from a local source such as a battery, or obtained from the power provided on the cable driving a downhole electrical submersible pump (not shown).

Further, it should be appreciated that the teachings of the present invention extend beyond controlling downhole devices. The control unit 92 can transmit data to surface equipment such as a display device 93a, an alarm 93b or a data recorder 93c via a suitable telemetry link 95 (e.g., hard-wire, acoustic signals, RF, EMF, etc.). The display device 93a can be used to provide the operator with a real-time or near real-time indication of the location of the fluid interface. The alarm 93b can be configured to signal that a predetermined condition has been detected in the well. The data recorder 93c can be used to recorded liquid interface movement data, as well as other data such as production rates, wellbore conditions (e.g., pressure, temperature, etc.) that can be used for extended monitoring of the reservoir. It should be understood that the display device 93a, an alarm 93b or a data recorder 93c are merely illustrative of devices that utilize the information provided by the fluid level sensor 90 for purposes other than controlling downhole devices. Devices such as these (separately or in combination) can be used in addition to or in lieu of a control unit for operating a downhole device such as a pump.

Figure 6:
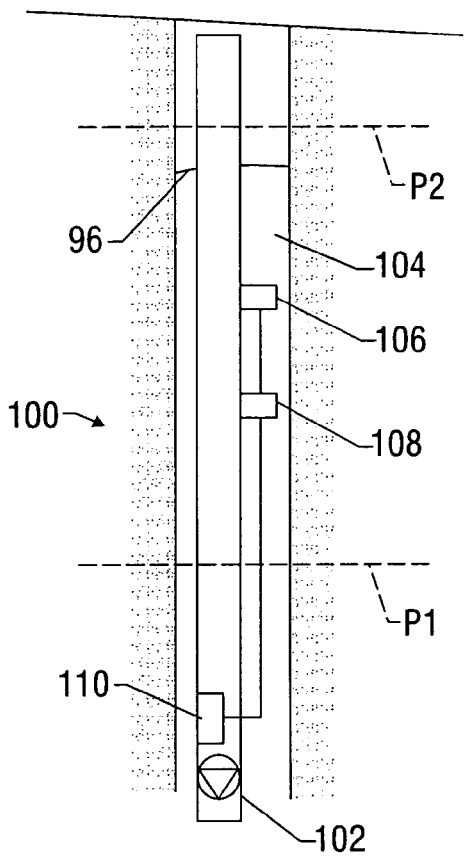
FIG. 6 schematically illustrates an elevation view of yet another embodiment of a well having a pump control system made according to the present invention.

Referring now to FIG. 6, in certain embodiments, a pump control system 100 operates a pump 102 based on an estimated height for a water column 104. The control system 100 includes a first sensor 106, a second sensor 108 and a control unit 110. The control unit 110 is programmed with pre-determined switch-points P1 and P2 for controlling the pump 102. The points P1 and P2 are points that if reached by the water column 104 will trigger an adjustment to pump operation (e.g., increasing/decreasing flow rate). The sensors 106, 108 are not positioned at the points P1 and P2. Rather, the sensors 106, 108 are position within the points P1 and P2. As will be discussed below, the control unit 110 utilizes the measurements from the sensors 106, 108 to extrapolate the height of the water column 104 and, based on this extrapolation, operate the pump 102.

In one method of operation, the control unit 110 measures the time needed for the fluid level to transition between the two sensors 106, 108. Based on this measurement, an effective inflow rate, an effective pump-off rate, or differential of the inflow and pump-off rate can be determined. Using this information, the control unit 110 can calculate a rate of change (e.g., increase or decrease) of the height of the water column 104. Based on this calculated rate of change, the control unit 110 can estimate the time required for the height of the water column to reach point P1 from sensor 108 or point P2 from sensor 106. The estimated time, in turn, is used to adjust operation of the pump, e.g., setting the optimal time to energize or de-energize the pump, selecting an optimal adjustment to the pump flow rate, etc. In certain applications, the control unit 110 can use additional data such as known wellbore/production tubing geometry (e.g., internal volume of the wellbore), a known inflow or pump off relationship, and measurements from other sensors (e.g., pressure sensors) in the wellbore in the calculations. It should thus be appreciated that the FIG. 6 embodiment creates a "virtual" sensor position extending well beyond one or both of the physical sensor positions.

In another mode of operation, the control unit 110 uses the calculated rate of increase/decrease in the height of the water column 104 to interpolate between the two sensors 106,108 to determine the height of the water column 104. Thus, at any given time, the control unit 110 can determine the approximate height of the water column 104. This information can be used to provide enhanced control over the pump 104. For example, the flow rate of the pump 104 can be adjusted to maintain a specified height for the water column 104. It should also be appreciated that the switch points P1 and P2 can be adjusted over time to account for changes in the reservoir. Further, both sensors 106, 108 need not be within switch points P1 and P2. For instance, in some embodiments, one of the sensors 106 or 108 is positioned at the switch point P2 or P1.

From the above, it should be appreciated that the teachings of the present invention include, but are not limited to, systems and methods for investigating the nature of materials, such as wellbore fluids, in a well adapted to produce hydrocarbons. While sensors for measuring thermal loading have been discussed above, any non-mechanical sensor adapted to produce distinct and different responses upon encountering a gas or liquid may used to achieve a similar functional control. By "non-mechanical" it is meant a sensor that does not utilize motion or a physical co-action between the sensed fluid and the sensor to produce a measurement.

As discussed previously, mechanical sensors such as pressure transducers employ mechanical parts that, due to repeated movement and/or a harsh, corrosive wellbore environment, tend to prematurely fail.

Additionally, the control systems utilizing such non-mechanical sensors are not limited to only downhole pumps. For instance, in certain embodiments, such sensors can be positioned inside production tubing extending through multiple production zones. One or more flow control devices (e.g., valves) can be used to control the in-flow of formation fluids at each of the production zones. A control unit uses the measurements from the sensors to identify the nature and make up of the fluid in the tubing (e.g., determining gas-oil, gas-water, or oil-water ratios). Based on the determinations, the control unit issues appropriate control signals to a flow control device such as a valve to adjust in-flows.

It should also be appreciated that the teachings of the present invention are not limited to any particular number of sensors. For example, in certain applications three or more sensors may be used. Indeed, some applications requiring a relatively precise determination of a fluid level height may utilize dozens or hundreds of sensors. For instance, a ribbon-like member can be overlaid with resistive elements distributed at spaced-apart intervals. In such arrangements, an enabling device can be configured to selectively enable the resistive elements in a manner that identifies the location of the first liquid-second liquid interface. The enabling device can, for example, utilize a specified voltage level, frequency and/or polarity to selectively enable the sensors. Additionally, the sensors can be addressable in certain applications to facilitate selective enablement of a plurality of sensors.

From the above, it should be appreciated that the teachings of the present invention include one or more non-mechanical fluid level sensors that are strategically deployed in body of fluid. While the described embodiments are described in the context of fluids in a wellbore, the sensed fluids can be in an underground storage tank, a storage cavern, or an above-ground tank. Moreover, the fluid can be a natural body of water (such as a lake or stream) or a body of water that are created during special circumstances (e.g., flood waters in an under-pass for a road). Indeed, the teachings of the present invention can be advantageously applied in nearly any situation where it is desirable to monitor, record or take responsive action to changes in height of a body of fluid. Furthermore, while embodiments of the present invention were discussed in connection with determining the location of gas-water interface, the present teachings can also be used to determine the location of a liquid-liquid interface (e.g., a water-oil interface).

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An apparatus for controlling a flow control device in a wellbore, comprising:
   (a) a non-mechanical fluid level sensor being positioned at a first depth in the wellbore, said non-mechanical fluid level sensor measuring a temperature of the fluid surrounding said non-mechanical fluid level sensor; and
   (b) a controller operatively coupled to said non-mechanical fluid level sensor and to the flow control device, said controller determining whether said fluid level sensor is surrounded by a liquid or a gas based on a temperature differential, said controller controlling the flow control device in response to the measurements provided by said non-mechanical fluid level sensor.

2. The apparatus according to claim 1 further comprising a power source coupled to said non-mechanical fluid level sensor for applying an electrical signal to said non-mechanical fluid level sensor, said non-mechanical fluid level sensor heating the surrounding fluid upon receiving the electrical signal.

3. The apparatus according to claim 2 wherein said power source cyclically heats said non-mechanical fluid level sensor.

4. The apparatus according to claim 1 further comprising a heating element adjacent said non-mechanical fluid level sensor for heating the surrounding fluid.

5. The apparatus according to claim 1 wherein the flow control device is a pump and wherein said controller controls the pump by one of: (i) energizing the pump; (ii) de-energizing the pump; (iii) energizing the pump after a pre-set time delay; (iv) de-energizing the pump after a pre-set time delay; (v) adjusting the flow rate of the pump.

6. The apparatus according to claim 1 further comprising a second sensor for measuring a parameter of interest relating to one of: (i) hydrocarbon production; (ii) water production; and (iii) wellbore conditions; and wherein said controller controls the pump in response to the measurements of said non-mechanical fluid level sensor and said second sensor.

7. The apparatus according to claim 1 comprising a second non-mechanical fluid level sensor being positioned at a second depth in the wellbore, said second non-mechanical fluid level sensor measuring a parameter of interest relating to the fluid surrounding said non-mechanical fluid level sensor; and wherein said controller is further configured to interrogate said non-mechanical fluid level sensor and said second non-mechanical fluid level sensor to determine the location of a gas-water interface in the wellbore.

8. A system for controlling a downhole pump used to adjust the height of a water column in a wellbore, comprising:
(a) a plurality of level sensors positioned along wellbore, said level sensors being adapted to measure the temperature of a surround wellbore fluid;
(b) a power source adapted to selectively transmit an electrical signal to said level sensors; and
(c) a controller operably coupled to said level sensors and said power source, said control unit determining whether said level sensor is surrounded by a liquid or a gas based on a temperature differential, said controller controlling the pump in response the temperature measurements provided by at least one of said level sensors, wherein said controller is programmed with a first and second switch point for adjusting operation of the pump, said controller determining whether either of said first or second switch points have been reached by processing the temperature measurements of at least one of said level sensors.

9. The system according to claim 8 wherein said power source is configured to cyclically heat said level sensors.

10. The system according to claim 8 wherein said controller uses at least said sensor measurements to determine the height of the water column by one of: (i) extrapolation, and (ii) interpolation.

11. The system according to claim 10 wherein said controller further utilizes the rate of change of the height of the water column to determine the height of the water column.

12. A method for controlling a flow control device in a wellbore, comprising:
(a) positioning a non-mechanical fluid level sensor in the wellbore;
(b) measuring a temperature of a fluid surrounding the non-mechanical fluid level sensor using the non-mechanical fluid level sensor;
(c) determining whether the non-mechanical fluid level sensor is surrounded by a liquid or a gas based on a temperature differential; and
(d) controlling the flow control device in response to the measurements provided by the non-mechanical fluid level sensor.

13. The method according to claim 12 further comprising:
(a) processing the temperature measurements, the processing including one of: (i) calculating a temperature differential; (ii) calculating a frequency; and (iii) calculating a rate of change of temperature; and
(b) determining whether the non-mechanical fluid level sensor is surrounded by a liquid or a gas using the processed temperature data.

14. The method according to claim 12 further comprising heating the fluid surrounding the non-mechanical fluid level sensor.

15. The method according to claim 14 wherein the fluid surrounding the non-mechanical fluid level sensor is cyclically heated.

16. The method according to claim 12 wherein the flow control device is a pump and wherein controlling the pump include an action selected from a group consisting of: (i) energizing the pump; (ii) de-energizing the pump; (iii) energizing the pump after a pre-set time delay; (iv) de-energizing the pump after a pre-set time delay; (v) adjusting the flow rate of the pump.

17. The method according to claim 12 measuring a second parameter of interest with a second sensor, the second parameter of interest being selected from one of: (i) hydrocarbon production; (ii) water production; and (iii) wellbore conditions; and wherein the flow control device is controlled in response to the measurements of the non-mechanical fluid level sensor and the second sensor.

18. The method according to claim 12 comprising:
(a) positioning a second non-mechanical fluid level sensor in the wellbore, the second non-mechanical fluid level sensor measuring a parameter of interest relating to the fluid surrounding the non-mechanical fluid level sensor; and
(b) determining the location of a gas-water interface in the wellbore using the measurements of one of (i) the non-mechanical fluid level sensor; and (ii) the second non-mechanical fluid level sensor.

19. The method according to claim 12 wherein the measured parameter of interest is selected from one of (i) a thermal property, (ii) an electrical property, (iii) a magnetic property, and (iv) a fluid property.

20. A method for optimizing hydrocarbon production by adjusting a height of a water column in a wellbore, comprising:
(a) positioning a pump in fluid communication with the water column;
(b) positioning a plurality of level sensors along the wellbore, the level sensors being adapted to measure the temperature of a surrounding wellbore fluid
(c) determining whether the non-mechanical fluid level sensor is surrounded by a liquid or a gas based on a temperature differential; and (d) controlling the pump in response to the temperature measurements provided by at least one of the level sensors.

21. The method according to claim 20 further comprising cyclically heating the surrounding wellbore fluid.

22. The method according to claim 20 further comprising:

(a) selecting a first and second switch point for adjusting operation of the pump;

(b) determining whether either of the first or second switch points have been reached by processing the temperature measurements of at least one of the level sensors.

23. The method according to claim 20 further comprising determining the height of the water column by one of: (i) extrapolation, and (ii) interpolation.

* * * * *